June 10, 1969 R. A. SPYRA 3,448,591
SPIRAL DISK DRIVE COUPLING
Filed Dec. 13, 1967 Sheet 1 of 4
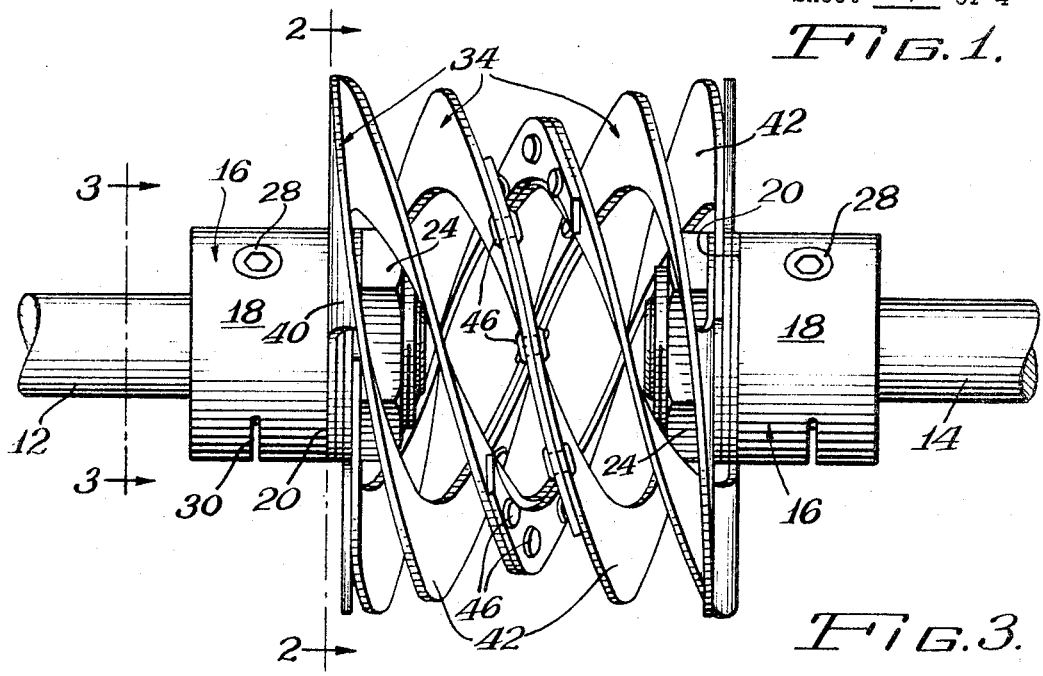
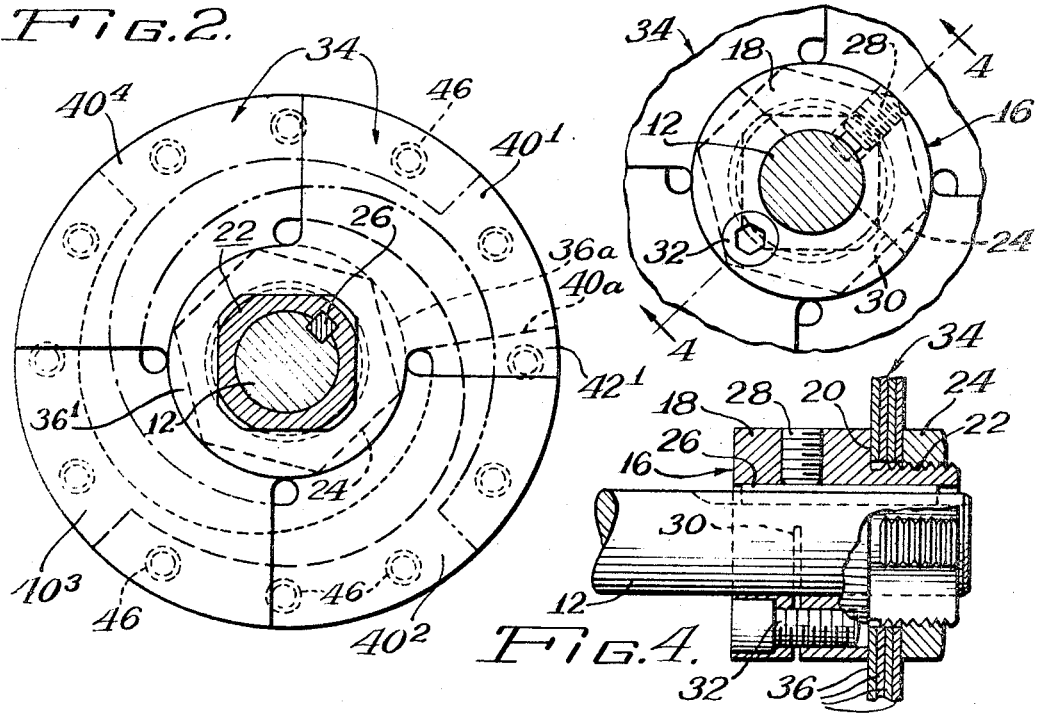
Inventor:
Rudolf A. Spyra
By Bair, Freeman & Molinare
Attys.

Fig. 6.A.

Inventor:
Rudolf A. Spyra
By Bair, Freeman & Molinare
Attys.

Inventor:
Rudolf A. Spyra
By Bair, Freeman & Molinare
Attys.

June 10, 1969

R. A. SPYRA 3,448,591

SPIRAL DISK DRIVE COUPLING

Filed Dec. 13, 1967

Inventor:
Rudolf A. Spyra
By Bair, Freeman &
Molinare Attys.

United States Patent Office 3,448,591
Patented June 10, 1969

3,448,591
SPIRAL DISK DRIVE COUPLING
Rudolf A. Spyra, 5344 N. Paulina St.,
Chicago, Ill. 60640
Filed Dec. 13, 1967, Ser. No. 690,117
Int. Cl. F16d 3/56
U.S. Cl. 64—15        13 Claims

ABSTRACT OF THE DISCLOSURE

A drive coupling for transmitting rotation from a drive shaft to a driven shaft wherein flexible and resilient disk-like elements of spiral shape serve to a connection between drive and driven hub elements. The spiral disk elements are formed of a suitable plastic material not subject to fatigue, and thereby the coupling has a long service life. Due to the flexible and resilient character of the spiral disk elements, they can tolerate drive and driven shafts which are out of alignment and which are arranged at various angles relative to each other, even as much as 90°.

Background and summary of invention

Spiral disks as couplings between drive and driven shafts are known according to Rayfield Patent 1,348,184 of Aug 3, 1920, but the spiral disks shown therein are of spring steel and therefore subject to fatigue and crystallization. On the other hand I employ a suitable plastic such as nylon or Lexan (polycarbonate resin) which are not subject to fatigue and may be provided in any suitable thickness and with single or multiple spiral transmission units to transmit any amount of horsepower required. I also provide a practical design of hub assembly for connection to the spiral disk elements, and disk-like transmission elements of suitable design which can be cut from flat stock material if desired. They can also be molded in plastic injection molding machines.

One object of my present invention is to provide a spiral disk drive coupling wherein a pair of hub members are adapted for mounting on drive and driven shafts, at least a pair of flexible and resilient disk-like elements of spiral shape being provided as a means for operatively connecting the hub members together, Another object is to provide these disc-like elements cut from flat stock or molded in a shape to have a central hub portion, a radial portion extending from a circumferential edge of the hub portion and a circumferential edge portion extending spirally from a radial edge of the radial portion.

Still another object is to provide two or more of the disk elements connected by their hub portions to the hub members and having their circumferential portions extending in opposite circumferential directions, the outer ends of the circumferential portions being connected together for the positive transmission of power from the drive shaft to the driven shaft in such manner as to permit axial variations between the two shafts.

A further object is to porvide a disk-like transmission element having a pair of circumferential portions extending from the outer ends of a radial portion of the element.

Still a further object is to provide disk-like transmission elements so designed that a plurality of them in substantially equally spaced circumferential arrangement may be mounted on the hub members which are so designed as to accommodate such an arrangement.

An additional object is to provide the disk elements with off-set portions between their radially extending and circumferentially extending portions so that a plurality of the elements may be mounted on a hub member with substantially no interference with each other during operation.

Another additional object is to provide disk-like transmission elements which are provided with circumferential portions of tapered shape for maximum efficiency compared to minimum material.

Still another additional object is to proivde a spiral disk drive coupling having torque control characteristics due to a construction which includes friction disks connected by spiral disc drive elements to the drive and driven hubs, and friction shoes for engaging the friction disks with each other.

A further additional object is to provide an assembly of spiral disk drive coupling and bearings, and a housing which is of split character and provided with sockets to receive the bearings, the housing enclosing the spiral disk drive coupling itself whereby the two housing halves when connected together completely house the coupling with the drive and driven shafts extending therefrom.

With these and other objects in view, my invention consists in the construction, arrangement and combination of the various parts of my spiral disk drive coupling, whereby the objects above contemplated are attained, as hereinafter more fully set forth, pointed out in my claims and illustrated in detail on the accompanying drawings wherein:

Brief description of the drawings

FIG. 1 is a side elevation of a spiral disk drive coupling embodying my invention; and showing drive and driven shafts in alignment with each other;

FIG. 2 is a sectional view thereof as taken on the line 2—2 of FIG. 1;

FIG. 3 is a sectional view on the line 3—3 of FIG. 1;

FIG. 4 is a sectional view on the line 4—4 of FIG. 3;

FIG. 6A is a similar face view on a slightly reduced scale of another form thereof;

Description of the preferred embodiment

Figure 5:
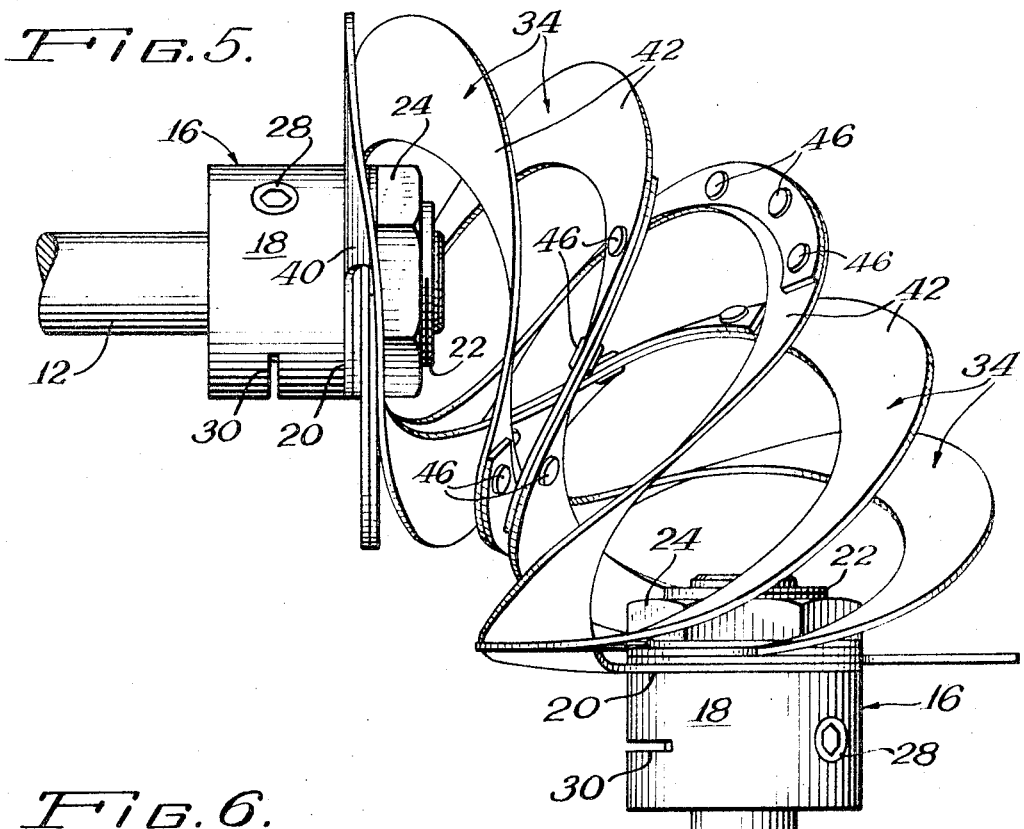
FIG. 5 is a side elevation similar to FIG. 1 showing the drive and driven shafts at right angles to each other.

On the accompanying drawings I have used the reference numeral 12 to indicate a drive shaft and 14 a driven shaft. Hub assemblies 16 are mounted on the drive and driven shafts, and each comprises a hub element 18 having a shoulder 20 and a threaded shank 22 beyond the shoulder. A clamp nut 24 is provided for the threaded shank 22. A key 26 serves to fix the hub element 18 rotationally with respect to the shaft on which it is mounted, and a set screw 28 is provided to retain the key in position. The hub element is further provided with a clamping slots 30 and a clamp screw 32 for taking up any play that might occur between the hub assembly and the shaft when the assembly is mounted on the shaft.

Figure 6:
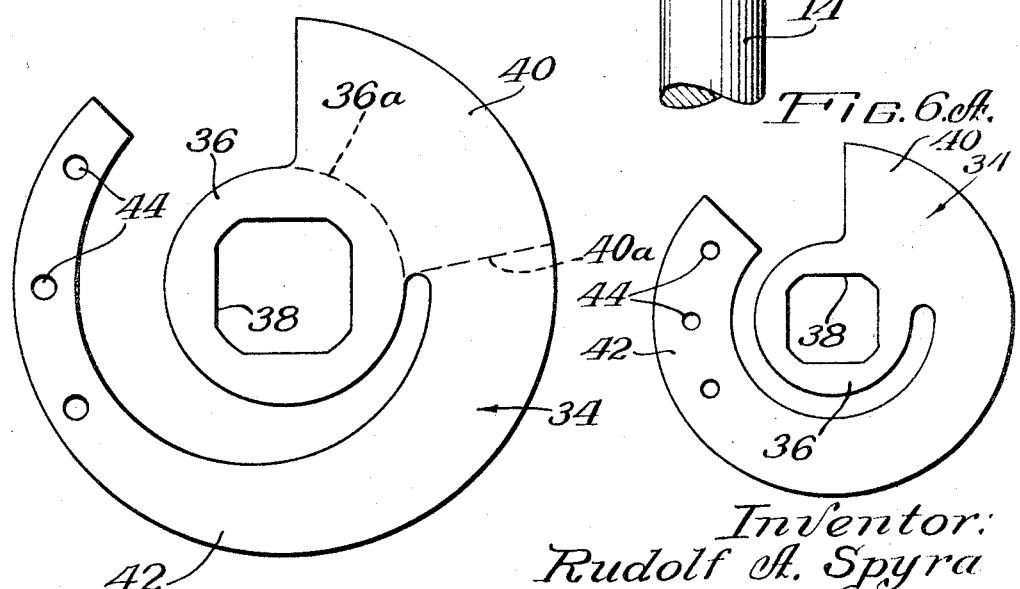
FIG. 6 is a face view of one form of a disk-like element suitable for my spiral disk-drive coupling and having a single drive arm.

I provide a plurality of disk-like transmission elements 34 each of which (as best shown in FIG. 6) comprises a central hub portion 36 having a shank hole 38, a radial portion 40 extending beyond the edge 36a of the central hub portion (indicated by a dash line) and a circumferential portion 42. The portion 42 extends from a radial edge 40a of the radial portion 40, the dash lines 36a and 40a being merely for the purpose of describing the characteristics of my special type of disk-like transmission element 34. The circumferential arm-like portion 42 is preferably tapered as illustrated in FIG. 6, that is, tapered in width, being widest adjacent the radial portion 40, for efficiency of power transmission compared to amount of material used in the transmission element. The arm 42 however may be non-tapered as shown in FIG. 6A for minimum waste of material when stamped from sheet material, and due to additional width the arm will be stronger and thereby capable of transmitting additional horse power. The shank hole 38 is somewhat squared and so is the threaded shank 22, the threads being provided across the corners of the square only so that one, two or four of the disk-like transmission elements 34 may be mounted on each of the hub assemblies 16, four thereof being shown in FIGS. 1 to 5 inclusive. Holes 44 provide for bolting or riveting the portions 42 together as shown in FIGS. 1, 2 and 5 (rivets 46). Four pairs of the transmission elements being used in this manner are capable of transmitting four times the horsepower of a single pair of transmission elements in an obvious manner. Therefore, if only one-fourth of the horsepower transmission is required, a single pair can be used. Obviously, of course, the thickness of the transmission elements may also be increased for additional horsepower transmission.

The use of resilient flexible transmission elements 34 of suitable plastic material permits suitable transmission of power whether the shafts 12 and 14 are aligned or somewhat misaligned. They also permit proper transmission when shafts are at various angles, an angle of 90° being shown in FIG. 5. My disclosed coupling also permits variations in axial spacing between the shafts 12 and 14. For instance, in FIG. 1 the transmission elements 34 are extended spring-fashion to a certain degree. Obviously, this degree may be increased or decreased and there would still be positive transmission of power from the drive shaft 12 to the driven shaft 14.

Figure 7:
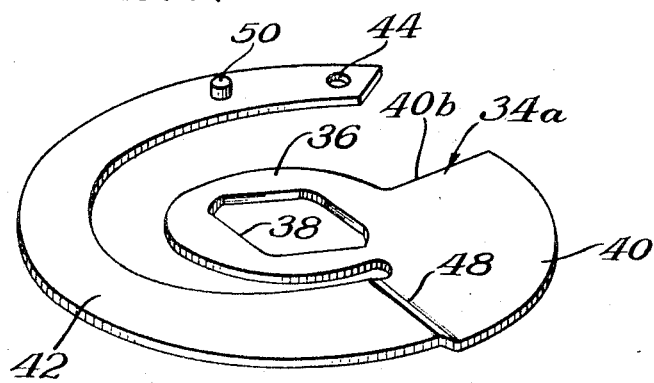
FIG. 7 is a perspective view thereof showing a slight modification.
Figure 10:
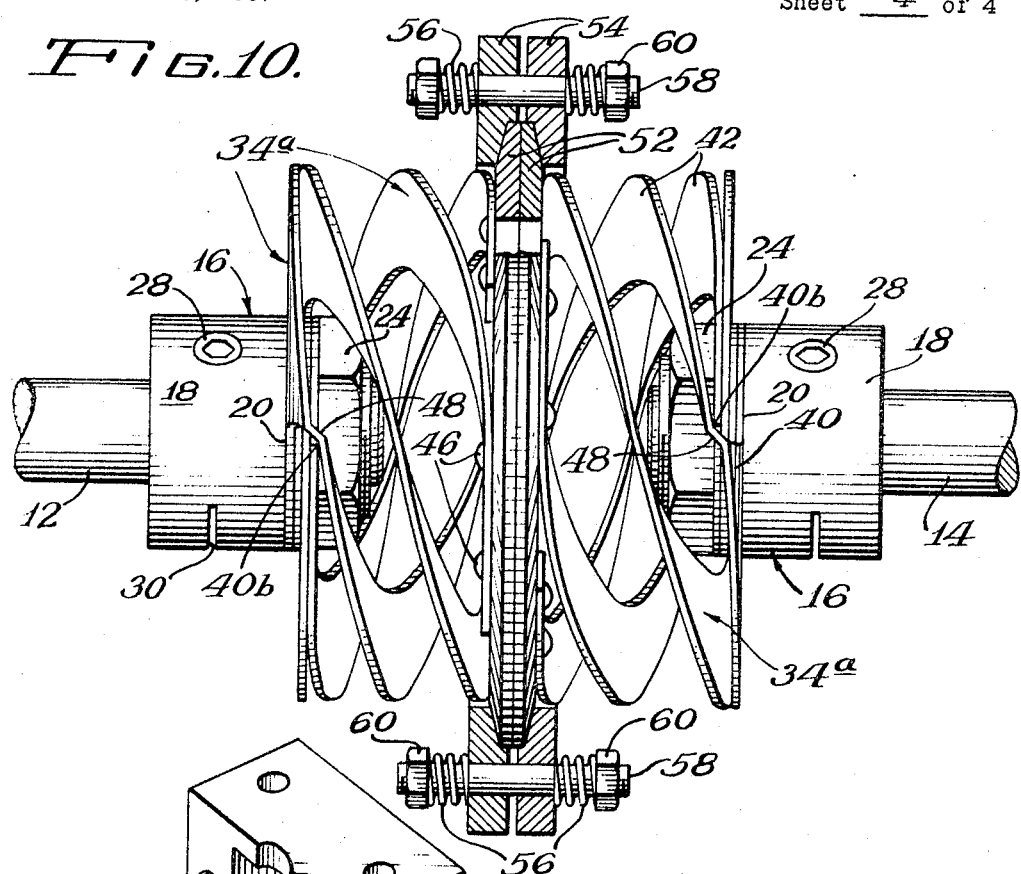
FIG. 10 is a side elevation similar to FIG. 1 showing a modification in which torque control means is incorporated with the spiral disk drive coupling.

In FIG. 7 I show a modified disk-like transmission element 34a similar in character to the one shown in FIG. 6 except it has an off-set 48 between the radial portion 40 and the circumferential portion 42. Referring to FIG. 10 this type of element is used and is particularly desirable where the spread between the hub elements is not very great, the off-set 48 serving to prevent interference of one element with the next radially spaced one particularly where the circumferential portion 42 passes the edge of the radial portion indicated at 40b in FIGS. 7 and 10.

Figure 8:
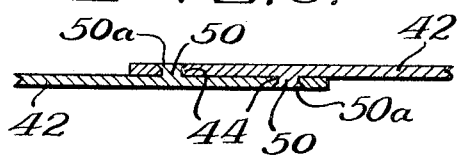
FIG. 8 is a sectional view on the line 8—8 of FIG. 7 showing the outer ends of two of the disk-like transmission elements riveted together.
Figure 9:
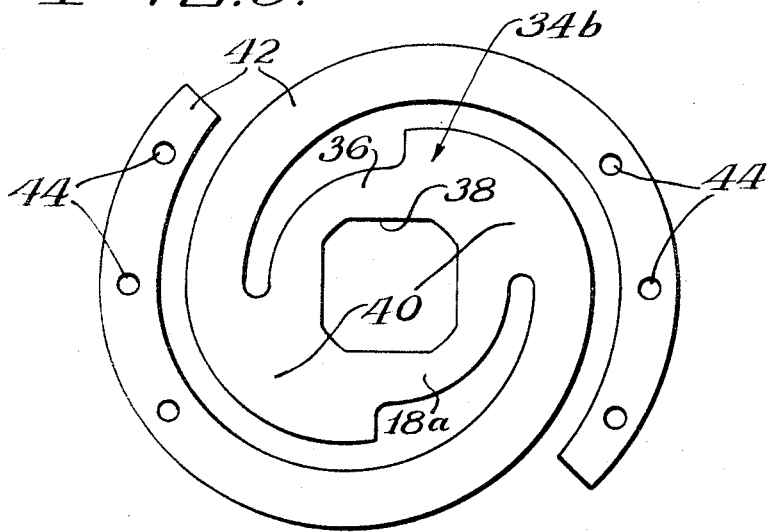
FIG. 9 is a face view similar to FIG. 6 showing a dual arm arrangement for the disk-like transmission element.

Another modification is shown in FIG. 7, in the form of a projection 50 molded on the circumferential arm 42 and a perforation 44 therein as distinguished from perforations 44 only shown in FIG. 6. The outer ends of arms 42 as shown in FIG. 8 may be operatively connected with each other by the projection 50 of one arm entering the perforation 44 of the other and "riveted" as at 50a by the application of suitable degree of heat and/or pressure in a well known manner.

My spiral disk drive coupling is suitable for torque control if constructed according to FIG. 10 wherein the outer ends of the circumferential arms 42 of the transmission elements 34a are riveted or otherwise secured to a pair of friction disks 52. Friction shoes 54 in the form of rings coact with the disks 52 and are biased to engage them by means of bolts 58, nuts 60 and springs 56. The adjacent faces of the friction disks 52 (which may also be ring shaped as illustrated in section at the top of FIG. 10) may be varied in an obvious manner by adjustment of the nuts 60 and thereby the tension of the springs 56 so that a predetermined degree of torque must be encountered before slippage will occur, thus limiting the transmission of torque from the drive shaft to the driven shaft.

Figure 11:
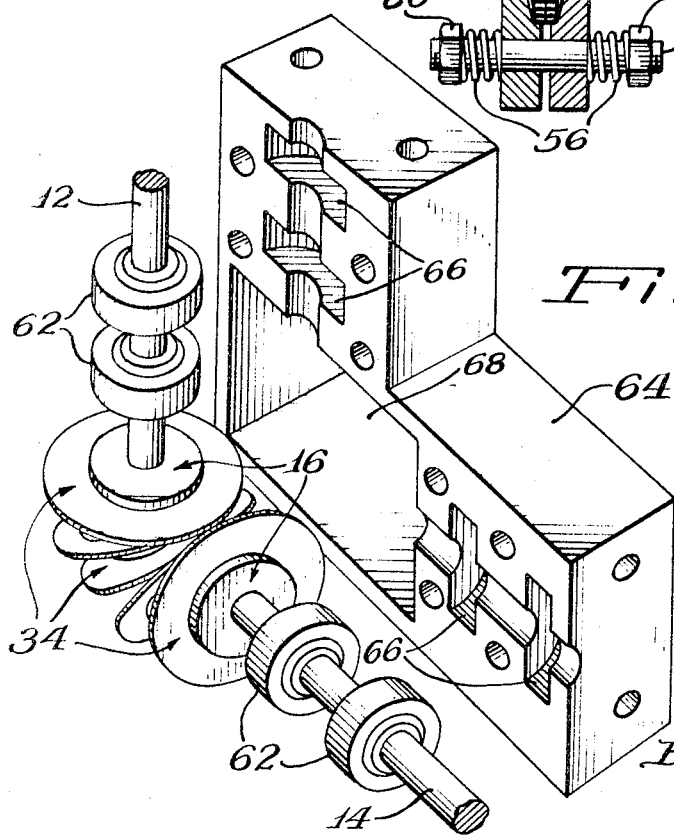
FIG. 11 is a perspective view of a spiral disk drive coupling unit complete with bearings for the drive and driven shafts thereof, and showing one-half of a split housing for enclosing the coupling and for mounting the bearings when the two halves of the housing are assembled together.

My spiral disk drive coupling is suitable for fabrication as an angle drive unit or the like as illustrated in FIG. 11 wherein bearings 62 are provided for the drive and driven shafts and one housing half 64 is illustrated. Two of these halves can be associated with each other in an obvious manner and each is provided with bearing receiving sockets 66 for the bearings 62 so that when the two halves are connected together the bearings are properly mounted and the coupling unit itself is housed within a socket 68 of the housing halves.

From the foregoing specification it will be obvious that I have provided a spiral disk drive coupling capable of transmitting rotation from one shaft to another whether misaligned or arranged at different angles relative to each other. Rotation is transmitted without change in velocity as between the two shafts due to the design and arrangement of the disk-like transmission elements 34. With the transmission elements formed of flexible resilient plastic material there is no problem of failure due to fatigue in the material, and the use of single or multiple transmission elements permits considerable variation in the degree of horsepower transmitted from the drive shaft to the driven shaft. The transmission elements are of simple but efficient character such that they can be stamped from sheet material or molded as desired.

Some changes may be made in the construction and arrangement of the parts of my spiral disk drive coupling without departing from the real spirit and purpose of my invention, and it is my intention to cover by my claims any modified forms of structure or use of mechanical equivalents which may reasonably be included within their scope.

I claim as my invention:

1. In a spiral disk drive coupling, a pair of hub members adapted for mounting on drive and driven shafts, and means for operatively connecting said hub members together comprising a pair of flexible and resilient disk-like elements, each having a central hub portion, a radial portion extending from a circumferential edge of said hub portion and a circumferential portion extending from a radial edge of said radial portion, one of said disk-like elements being mounted on one of said hub members and the other of said disk-like elements being mounted on the other of said hub members with said circumferential portions extending in opposite circumferential directions, the ends of said circumferential portions remote from said radial portions being connected together for transmission of power from said drive shaft to said driven shaft.

2. A spiral disk drive coupling according to claim 1 wherein said disk-like elements are formed of plastic material.

3. A spiral disk drive coupling according to claim 1 wherein said radial portion and said circumferential portion of each of said disk-like elements are of dual character, and said circumferential portions thereof extend from opposite radial edges of said radial portion thereof.

4. A spiral disk drive coupling according to claim 1 wherein a plurality of said disk-like elements are connected in substantially equally spaced circumferential arrangement to each of said hub members.

5. A spiral disk drive coupling according to claim 1 wherein said disk-like elements have axially off-set portions between said radially extending and said circumferentially extending portions.

6. A spiral disk drive coupling according to claim 1 wherein said circumferential portions are tapered in width, being widest adjacent said radial portions.

7. A spiral disk drive coupling according to claim 1 wherein said disk-like elements have axially off-set portions between said radial and said circumferential portions.

8. A spiral disk drive coupling according to claim 7 wherein said disk-like elements are formed of plastic material.

9. A spiral disk drive coupling according to claim 1 wherein each of said hubs is provided with a shoulder and a threaded shank beyond said shoulder, said hub portions of said disk-like elements being mounted on said shanks, said nuts threaded on said shanks to clamp said hub portions against said shoulders of said hub members.

10. A spiral disk drive coupling according to claim 2 wherein the means for connecting said circumferential portions together comprises a projection on one circumferential portion and a perforation in the other, said projection of one circumferential portion being riveted with the respect to said perforation of the other circumferential portion.

11. A spiral disk drive coupling according to claim 1 wherein the means for connecting said circumferential portions together comprises a pair of friction disks, one connected to each of said pair of disk-like elements, and friction shoe means arranged to provide a friction drive between said pair of friction disks whereby the transmission of power from one of said hub members to the other is limited as to torque by said friction shoe means.

12. A spiral disk drive coupling according to claim 11 wherein said friction shoe means comprises a pair of ring-like elements, one engaging each of said friction disks, and spring means biasing said ring-like elements toward said friction disks.

13. A spiral disk drive coupling according to claim 1 wherein bearings are provided for said drive and driven shafts, and a split housing encloses said spiral disk drive coupling and has sockets receiving said bearings upon the two halves of said split housing being connected together.

References Cited

UNITED STATES PATENTS

| | | | |
|---|---|---|---|
| 539,161 | 5/1895 | Almond | 64—15 |
| 1,348,184 | 8/1920 | Rayfield | 64—15 |
| 1,635,496 | 7/1927 | Peigne | 64—15 |
| 1,719,411 | 7/1929 | Weidenbach | 64—15 |
| 2,991,637 | 7/1961 | Lochow | 64—15 X |

HALL C. COE, *Primary Examiner.*

U.S. Cl. X.R.

64—27